(12) United States Patent
Singla et al.

(10) Patent No.: US 8,417,672 B2
(45) Date of Patent: Apr. 9, 2013

(54) ITEM LEVEL RECOVERY

(75) Inventors: Amit Singla, Redmond, WA (US); Sai Peyyeti, Andhra Pradesh (IN); Seshagiri K. V., Andhra Pradesh (IN); Pankaj Khanzode, Andhra Pradesh (IN); Harsh Mittal, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 215 days.

(21) Appl. No.: 12/901,574

(22) Filed: Oct. 11, 2010

(65) Prior Publication Data

US 2012/0089576 A1 Apr. 12, 2012

(51) Int. Cl.
*G06F 7/00* (2006.01)

(52) U.S. Cl.
USPC .......................................... 707/651; 707/681

(58) Field of Classification Search .................. 707/657, 707/651, 681
See application file for complete search history.

(56) References Cited

U.S. PATENT DOCUMENTS

| | | | |
|---|---|---|---|
| 7,650,356 B2 | 1/2010 | Raheem | |
| 7,676,502 B2 | 3/2010 | Atluri et al. | |
| 8,099,391 B1* | 1/2012 | Monckton | 707/647 |
| 2004/0139128 A1* | 7/2004 | Becker et al. | 707/204 |
| 2004/0230863 A1 | 11/2004 | Buchhorn | |
| 2005/0044244 A1 | 2/2005 | Warwick et al. | |
| 2006/0242205 A1 | 10/2006 | Schmidt et al. | |
| 2007/0005669 A1 | 1/2007 | Mueller et al. | |
| 2008/0126844 A1* | 5/2008 | Morita et al. | 714/6 |
| 2010/0077160 A1 | 3/2010 | Liu et al. | |
| 2010/0169283 A1 | 7/2010 | Atluri et al. | |
| 2011/0087874 A1* | 4/2011 | Timashev et al. | 713/100 |

OTHER PUBLICATIONS

"International Search Report", Mailed Date: May 1, 2012, Application No. PCT/US2011/053011, Filed Date: Sep. 23, 2011, pp. 8.
Sears, et al., "Segment-Based Recovery: Writeahead logging revisited" Retrieved at << http://www.vldb.org/pvldb/2/vldb09-583.pdf >>, VLDB Endowment, Aug. 24-28, 2009, pp. 12.
Zhou, et al., "Online Remote Data Backup for iSCSI-based Storage Systems", Retrieved at << http://iweb.tntech.edu/hexb/publications/Conferences/Ben-IC04-CR.pdf >>, pp. 6.
Yang, et al., "TRAP-Array: A Disk Array Architecture Providing Timely Recovery to Any Point-in-time", Retrieved at << http://citeseerx.ist.psu.edu/viewdoc/download?doi=10.1.1.77.9769&rep=rep1&type=pdf >>, In Proceedings of The 33rd Annual International Symposium on Computer Architecture, Jun. 17-21, 2006, pp. 12.

* cited by examiner

*Primary Examiner* — Amy Ng
(74) *Attorney, Agent, or Firm* — Michael B. Dodd; Dodd Law Group

(57) ABSTRACT

A backup and restore system may present recovered backup data as local resources and in a read and write manner so that the recovered backup data may be accessed using an application that created the data. In some embodiments, the recovered data may be read only data, but a differencing virtual hard disk (VHD), Common Internet File System protocol, or differencing driver may be used to present a read/write version of the data. Additionally, the data may be presented using iSCSI or other technologies to present the data as local data, even though the data may be remotely located. The backup and restore system may additionally use VHD differencing technologies to create multiple backups.

20 Claims, 2 Drawing Sheets

ITEM LEVEL RECOVERY

BACKGROUND

Backup and restore systems are commonly used to make archive copies of data so that the data may be recovered in event of a catastrophic or partial loss of data. In many cases, a backup system may backup data without being able to understand or parse the data. For example, an application may have a database that may be stored in a single file or series of files. A backup application may be capable of making a copy of the files associated with the database, but may not be able to retrieve a single record from the database.

In many cases, a database may be very large. When a single piece of data is desired from a backup database, a common method may be to restore the entire database and allow an application that created the database to access the database to restore the data. In many cases, the application may not operate on network resources, but may only operate on local resources. In such cases, the entire database, which may be terabytes in size, may be transferred from the backup system to the local system so that the application may access the database.

SUMMARY

A backup and restore system may present recovered backup data as local resources and in a read and write manner so that the recovered backup data may be accessed using an application that created the data. In some embodiments, the recovered data may be read only data, but a differencing virtual hard disk (VHD), Common Internet File System protocol, or differencing driver may be used to present a read/write version of the data. Additionally, the data may be presented using iSCSI or other technologies to present the data as local data, even though the data may be remotely located. The backup and restore system may additionally use VHD differencing technologies to create multiple backups.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
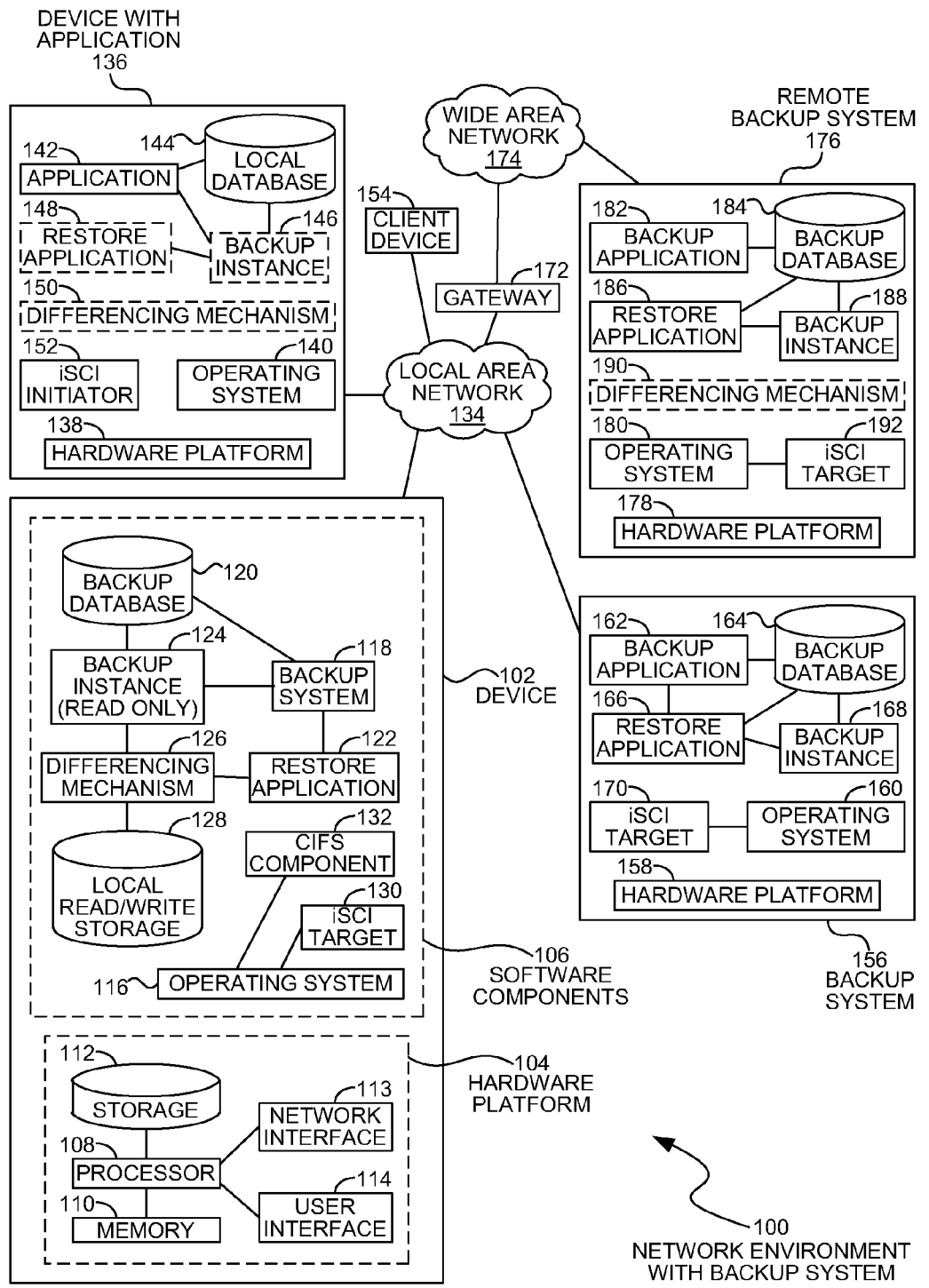
FIG. 1 is a diagram illustration of an embodiment showing a network environment with a backup system.

A backup copy of a database may be made available to an application so that a single item may be recovered from the database. In some embodiments, the database may be made available in a read/write manner so that the application may successfully interact with the recovered version of the database. The backup copy may also be made available as a local storage device.

In many complex databases, an application that accesses the database may not be capable of accessing the database in a read only state. Such applications may use a read/write access as part of a fundamental architecture of the application and may not be readily changed.

In many backup systems, the backup copies of a database may be stored as read only copies of the database. Read only copies may be stored for a certain period of time as part of an archival strategy and may be referenced at later times for legal or other reasons. As such, the read only copies may not be altered once the backup has been performed.

In order to allow read/write access to the backup copy of the database, differencing techniques may be used to create a read/write version of a read only database. Differencing techniques may involve using a differencing Virtual Hard Disk (VHD) which may be configured to process write commands into a differencing VHD while keeping the read only database intact. Another differencing technique may involve using a specialized file system filter driver or volume bus driver that may separate write operations from read operations so that the read only database may remain intact and the write operations are stored separately.

Backup systems are often stored remotely. A remote location may be any location outside of a local device. For example, a remote location may be offsite or merely on another device within a local area network. In many database applications, the application may be configured to not access databases that are not locally accessible.

In such cases, transferring a large database from a remote location to a local location may be a very costly operation, in terms of time, network bandwidth, local storage, and other factors. In such cases, a remote backup may be presented as a local resource by using iSCSI or other technologies that may allow remote storage devices to be presented as a locally attached storage device.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and may be accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. The term "modulated data signal" can be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

FIG. 1 is a diagram of an embodiment 100, showing a network environment in which a backup and restore system may operate. Embodiment 100 is a simplified example of a hardware and software environment in which backup instances may be created and made available to an application in a read/write manner, while keeping the backup instance in a read only state.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

Embodiment 100 is an example of an environment in which backup instances of a database may be presented to an application in a read/write manner, even though the backup database instance may be a read only instance.

Many large applications may use very large databases, such as large collaboration systems, email and messaging systems, and other applications. Such databases may be many gigabytes or terabytes in size and may also be accessible only in a read/write manner In other words, an application may access the database only when the database is available in a read/write manner and not when the database is in a read only manner.

Backup instances may be created of a database as part of a routine backup operation that may create a copy of the database that may be used to restore the database in event of a catastrophic failure, as well as to restore a record or item that may be inadvertently deleted.

In the case of recovery from a catastrophic failure, an entire database may be recovered. The recovered database may replace the lost database and an application may resume operations using the recovered database. In a typical catastrophic recovery, the entire database may be transferred to the location of the original database prior to resuming operations.

In the case of recovering individual items from the database, a read/write instance of the database may be created using differencing mechanisms. A differencing mechanism may create a child image and a parent image, where the parent image may be a read only version of the database and a child image may contain any modified blocks from the parent image. By using a differencing mechanism, a read only instance of a recovered database may be used as a parent image and a read/write set of data may be a child image.

From the standpoint of the application accessing the recovered database, the recovered database may appear as a read/write version. However, the archived and backed up instance of the database may remain a read only version.

Several different mechanisms may be used to implement a differencing mechanism. In one embodiment, a Virtual Hard Disk (VHD) may be configured as a differencing VHD. A differencing VHD may contain changes or differences between the child VHD and a parent VHD. In such an embodiment, a recovered read only database may be stored in a parent VHD and a differencing VHD may be used to present a read/write version of the recovered database to an application.

In another embodiment, a differencing driver may use a read/write file to capture write commands and to respond to read commands on overwritten data. The differencing driver may access a read only copy of a recovered database to respond to read commands.

In still another embodiment, a differencing mechanism may be implemented using a file system level function. For example, a Network File System (NFS), Server Message Block (SMB), or Common Internet File System (CIFS) file system may contain a differencing mechanism. Such a differencing mechanism may capture changes to a parent image and store the changes in a file or file system.

Some applications may be configured to only access local databases and may not function properly when a database may be accessed over a network. In such embodiments, a recovered backup instance may be made available using Internet Small Computer System Interface (iSCSI) over a network. An iSCSI target may be a computer system that contains a storage device that an iSCSI initiator may access over a network. The iSCSI protocol may operate such that the iSCSI target may appear as a local device attached to the same device as the iSCSI initiator.

Using an iSCSI initiator/target protocol, a recovered database may be presented to an application as if the recovered database were a locally attached database, even though the recovered database may be located on another device that may be within a local area network or even accessed over a wide area network, such as the Internet.

Embodiment 100 illustrates a device 102 that may prepare and present recovered backup instances for use by an application. The device 102 may operate a backup system and may also provide a restored instance of a backed up database to another device in a read/write manner.

As illustrated, the device 102 may provide both backup services and restoration services for a database. In other embodiments, the device 102 may facilitate restoration services where another device may provide the backup services.

The device 102 is illustrated having a hardware platform 104 and various software components 106. The device 102 as illustrated represents a conventional computing device, although other embodiments may have different configurations, architectures, or components.

The device 102 may be a server computer, desktop computer, or comparable device. In some embodiments, the device 102 may be a laptop computer, netbook computer, tablet or slate computer, wireless handset, cellular telephone, or any other type of computing device.

The hardware platform 104 may include a processor 108, random access memory 110, and nonvolatile storage 112. The hardware components 104 may also include a network interface 114 and a user interface 116.

The software components 106 may include an operating system 116 on which various applications may operate.

A backup system 118 may make backup copies of an application's database and store the backup copies in a backup database 120. In many embodiments, the backup system 118 may perform a backup operation on a regular basis, such as nightly, weekly, or some other period. The backup system 118 may perform complete backups, where the entire application database may be copied to the backup database 120. In some cases, the backup system 118 may perform an incremental backup, where the changed portions of the database may be stored without storing the unchanged portions.

The backup system 118 may operate without any knowledge of the application's database. Such systems may perform a backup operation on a set of data files without having the ability to parse or understand the data files. Such backup systems may be used to backup any type of file on a system, including executable and data files and may be a general purpose backup system.

In some embodiments, the backup system 118 may be specialized to perform backups on specific files or specific databases. In such embodiments, the backup system may be capable of parsing a database or performing limited operations on the database as part of backing up the database. Such embodiments may be capable of recreating a database instance in various configurations or recreating a subset of a database.

When requested, the backup system 118 may create a backup instance 124, which may represent all or a portion of a backup at a specific period of time. In a typical embodiment, a backup database 120 may contain backup data from several different backup operations.

A restore application 122 may be used by a user to select a specific backup instance to access, and the backup system 118 may create the backup instance. In embodiments that may use incremental backups, the backup system 118 may perform various operations to create a full instance of a backup.

The restore application 122 may also configure a differencing mechanism 126 that may use a local read/write storage 128 to create a read/write version of the backup instance 124. The differencing mechanism may present a read/write version of the backup instance 124 to an application while keeping the backup instance 124 as a read only instance.

In some embodiments, the backup instance 124 may be presented as a locally attached storage device to an application. One mechanism for doing so may be to use an iSCSI target 130 on the device 102. The Internet Small Computer System Interface (iSCSI) is an Internet Protocol (IP) based storage networking standard for linking data storage facilities. The protocol allows clients, called initiators, to send SCSI commands to storage devices, called targets, over a network connection. In some cases, the network connection may be a local area network, while in other cases, the network connection may be a wide area network such as the Internet.

The iSCSI target 130 may be used to present a storage device to a remote application where the remote device may interact with the storage device using SCSI commands as if the storage device were a local storage device. On the application device, an iSCSI initiator may be used to send commands to the iSCSI target 130.

In a typical use scenario, the device may create a partition, virtual hard disk, logical volume, or other storage volume that contains the backup instance 124 as presented by the differencing mechanism 126. The iSCSI target 130 may be configured to present the volume to the application. In other use scenarios, a portion of a volume may be set aside for the backup instance 124 and differencing mechanism 126. For example, a directory within a shared directory structure may be created in which to share the backup instance 124 and differencing mechanism 126.

In another embodiment, a Common Internet File System (CIFS) or related type of file system may be used to present the differencing mechanism 126 and backup instance 124 to an application on another device. CIFS may be a derivative of a Server Message Block (SMB) and may be related to various other file systems, including Samba, NetBIOS, and other related communication systems. For the purposes of this specification and claims, the term "CIFS" shall include any related file systems derived from or operating in a similar fashion as CIFS.

CIFS components 132 may be used to make the differencing mechanism 126 and backup instance 124 available over a network to a remotely located application.

The device 102 may be connected to other devices through a local area network 134. One such device may be a device 136 on which an application may execute.

The device 136 may have a hardware platform 138, which may be the same or similar to the hardware platform 104. An operating system 140 may execute on the hardware platform 104 and an application 142 may execute within the operating system 140.

The application 142 may access a local database 144 as part of the normal operation of the application 142. The local database may be any type of data storage, such as a set of files in a file system, a relational database, or other data storage.

The application 142 may access a backup instance 146 in order to perform a recovery operation. In many cases, a user may wish to access a previous backup to retrieve a deleted object, such as a deleted file or record from the database.

The backup instance 146 may be locally available. In some embodiments, the backup instance 146 may be copied to the device 136. In other embodiments, the backup instance 146 may be made available over a network, and iSCSI or other technologies may be used to access the backup instance 146.

In some embodiments, a restore application 148 may reside on the device 136. In such embodiments, the restore application 148 may interact with a backup application that may reside on another device, such as the device 102 or devices 156 or 176. In such embodiments, the restore application 148 may send and receive communications with a backup application on another device to retrieve a backup instance, then the restore application 148 may configure the backup instance so that the application 142 may access the backup instance. Such configuration may include configuring a differencing mechanism and making the backup instance available over a network.

The local restore application 148 may configure a differencing mechanism 150 on the device 136. The differencing mechanism 150 may reside on the device 136.

In such embodiments, the differencing mechanism 150 may access a read only version of a backup instance that is located remotely or locally. In an example of a local backup instance, the differencing mechanism 150 may access a backup instance 146. In an example of a remote backup instance, the differencing mechanism 150 may access the backup instance 124.

When the differencing mechanism 150 is operated on the same device as the application 142, the differencing mechanism 150 may also access read/write storage that is available on the device 136. In some cases, a local differencing mechanism 150 may access a read/write storage that is located on a different device.

In embodiments where iSCSI or similar technologies are used to present the backup instance, an iSCSI initiator 152 may be used to send commands to an iSCSI target, such as the iSCSI target 130 on device 102. Such technologies may be used to access a read only backup instance, such as the backup instance 124, as well as a differencing mechanism 126 or a read/write storage 128.

A client device 154 may be used to access and control the application 142 as well as the restore applications, such as restore applications 122 or 148. The client device 154 may be a computer system with a processor and a hardware platform. In some embodiments, a browser or other application may be used to access the application 142 as well as a restore application. A user or administrator may have access privileges to cause a restore application to select a backup instance, create a backup instance, and configure the backup instance for read/write access by the application 142.

A backup system 156 may be accessible through the local area network 134. The backup system 156 may make backup copies of the local database 144 and may be capable of creating a backup instance that may be accessed by a restore application and differencing mechanism.

The backup system 156 may have a hardware platform 158, which may include similar components as the hardware platform 104, including a processor. An operating system 160 may execute on the hardware platform and provide support for various applications, including a backup application 162.

Similar to the backup system 156, a remote backup system 176 is illustrated as being accessible through the local area network 134, a gateway 172, and a wide area network 174. The wide area network 174 may include the Internet, and the backup system 156 may represent a cloud-based or other offsite backup system.

The backup systems 156 and 176 may represent two architectures for backup systems. The backup system 156 may be a local backup system that may operate within a local area network 134 and may provide backup services to many different applications and devices. Many general purpose backup systems may backup entire file systems or the entire contents of various storage devices. In some cases, such backup systems may backup files of a certain type or may backup other subsets of a file system. In general, such general purpose backup systems may backup files without regard to the contents of the files and may backup files using a bit-by-bit backup technique.

In some embodiments, the backup systems 156 and 176 may provide specialized backup operations for different applications. For example, a messaging or email management system may interact with a backup system to backup messages separately from administrative or configuration information. In another example, a file sharing application may have a backup system that backs up certain files in a different manner than other files. In such embodiments, the backup systems may be capable of parsing the stored data to handle the data appropriately.

Backup system 176 may have a hardware platform 178. In some embodiments, the hardware platform 178 may be the same as the hardware platform 104. In other embodiments, the hardware platform 178 may be a cloud computing platform or other type of hardware platform.

Both backup systems 156 and 176 may have a backup application 162 and 182, respectively, and may maintain backup databases 164 and 184, respectively. In some embodiments, the various backup systems 156 and 176 may have restore applications 166 and 186 that may create backup instances 168 and 188, respectively. In some embodiments, the backup systems 156 and 176 may also have a differencing mechanism, such as the differencing mechanism 190.

In many cases, the backup systems 156 and 176 may have iSCSI targets 170 and 192 that may be capable of making a backup instance available in a read only fashion. The backup systems 156 and 176 may also be capable of making a backup instance available in a read/write fashion when a differencing mechanism may be used.

Figure 2:
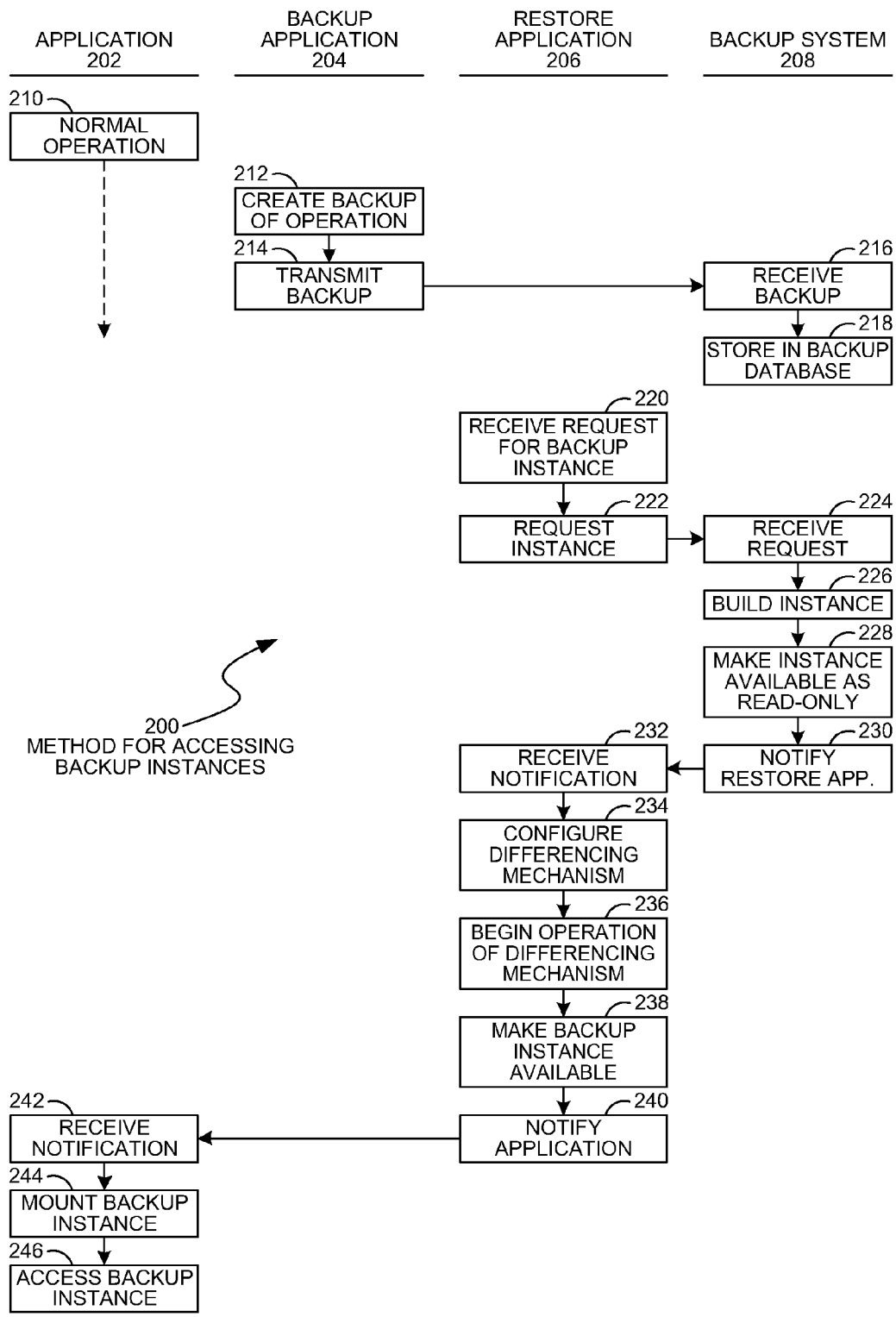
FIG. 2 is a timeline illustration of an embodiment showing a method for accessing backup instances.

FIG. 2 is a timeline illustration of an embodiment 200 showing a method for accessing a backup instance. The process of embodiment 200 is a simplified example of how an application 202, backup application 204, restore application 206, and a backup system 208 may interact to restore information from a backup system.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 200 illustrates the interactions between different applications or services to create a backup image, then use the backup image to recover information. In some embodiments, the application 202, backup application 204, restore application 206, and backup system 208 may each reside on a different device. In other embodiments, two or more of the application 202, backup application 204, restore application 206, and backup system 208 may reside on the same device.

The application 202 may be any application that consumes data. The application 202 may store data in a database, file, or other data storage mechanism. For the purposes of the example of embodiment 200, the application 202 may store data in a database. In block 210, the application 202 may operate normally, which may involve storing data in a database.

The backup application 204 may be an application that performs backup operations. The backup application 204 may schedule a backup operation and create a backup of the database in block 212 and transmit the backup in block 214 to the backup system 208. The backup operation in block 212 may be an incremental or full backup, depending on the particular embodiment.

The backup system 208 may be a service that maintains backups and may be capable of retrieving backup instances from the database. The backup system 208 may receive the backup in block 216 and store the backup in the backup database in block 218.

The operations of blocks 210 through 218 may be performed on a regular basis. For example, some embodiments may perform a backup operation every evening when demand on the application 202 may be very low. The normal operation of block 210 and repeated backup of blocks 212 through 218 may continue until a restore application 206 may receive a request for a backup instance in block 220.

The restore application 206 may be an application that manages recovery of a database instance and presentation of the recovered data to the application 202.

The restore application 206 may request an instance in block 222 from the backup system 208. The backup system 208 may receive the request in block 224 and build an instance in block 226.

The backup instance may be a particular instance created by a specific backup operation. For example, a backup instance for Monday evening may be selected. The backup system 208 may build the instance from a backup database. In some cases, the backup system 208 may create the instance from a full backup and one or more incremental backups.

Once the instance is created in block 226, the backup system 208 may make the instance available as read only in block 228.

In many embodiments, the backup system 208 may be located on a different system from the application 202. In such embodiments, the backup instance presented in block 228 may be stored on the backup system 208 and may be accessed over a network connection.

In some cases where the backup instance may be very large, such as restored databases that may be many gigabytes or terabytes in size, there may be a large cost in moving the restored database to the same device as the application 202. The cost me be in time, network bandwidth, processing power, or other costs. In order to allow a restore operation while minimizing the cost, the backup system 208 may use iSCSI or other techniques to allow access to the restored database without transferring the entire database over a network connection.

Once the backup instance is available, the backup system 208 may notify the restore application in block 230. The restore application 206 may receive the notification in block 232 and may begin preparing the recovered backup instance for use with the application 202.

The restore application 206 may configure a differencing mechanism in block 234. The configuration of the differencing mechanism may involve establishing parent and child objects where the parent object may be the backup instance and the child object may be a read/write file. The differencing mechanism may begin operation in block 236.

The restore application 206 may make the backup instance available in block 238. In some embodiments, the operations of block 238 may involve configuring a volume for access using iSCSI or other file sharing mechanisms. In some embodiments, the file sharing mechanism may present the differencing mechanism and backup instance as a local storage mechanism.

Once the backup instance is available, the restore application 206 may notify the application in block 240. The application 202 may receive the notification in block 242 and mount the backup instance in block 244 and access the backup instance in block 246.

In some embodiments, the restore application 206 may send a message to the application 202 in block 240 that may include a link or address for the restored backup instance. The message may also include one or more commands, scripts, or other information so that the application 202 may connect to and mount the restored backup instance.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. At a computer system, said computer system including a computer processor and system memory, said computer system communicative coupled to a backup system via a computer network, a method for providing an application with access to a backup instance to perform a recovery operation, said method comprising:
   identifying a read only backup instance resident at said backup system;
   causing a restore application associated with said application to configure said read only backup instance for read/write access by the application, including:
      accessing said read only backup instance;
      configuring a differencing mechanism to create a read/write version of said read only backup instance in read/write storage, including establishing said read only backup instance as a parent object and establishing a read/write file as a child object of said read only backup instance to store captured changes to said read only backup instance; and
   presenting said read/write version of said read only backup instance to said application by utilizing a storage volume to contain both said read only back up instance and said read/write file such that write operations from said application are stored separately in said read/write file by using the differencing mechanism and read operations from said application are accessed from said read only backup instance.

2. The method of claim 1, said differencing mechanism comprising a differencing Virtual Hard Disk.

3. The method of claim 1, said differencing mechanism comprising a driver that processes write commands using said read/write storage and processes read commands using said read only storage.

4. The method of claim 1, wherein identifying a read only backup instance at said backup system comprises identifying a remote read only instance at said backup system; and
   wherein presenting said read/write version of said read only backup instance to said application comprises presenting said read/write version of said remote read only backup instance to the application as a locally attached storage device.

5. The method of claim 4, wherein accessing said read only backup instance comprises accessing said read only backup instance using Internet Small Computer System Interface protocol.

6. The method of claim 4, wherein accessing said read only backup instance comprises accessing said read only backup instance using Common Internet File System protocol.

7. The method of claim 6, wherein said differencing mechanism comprising a differencing Virtual Hard Disk.

8. A system comprising:
   a processor;
   a network connection;
   a connection to a backup storage system comprising a read only backup instance of a database;
   a connection to a read/write storage system;

a differencing mechanism that is configurable to use said read/write storage system to process write commands; and a backup recovery system, the backup recovery system configured to:
    identify said read only backup instance; and
    cause a restore application to configure said read only backup instance for read/write access by an application, including:
        accessing said read only backup instance; and
        configuring said differencing mechanism to create a read/write version of said read only backup instance in said read/write storage system, including establishing said read only backup instance as a parent object and establishing a read/write file as a child object of said read only backup instance to store captured changes to said read only backup.

9. The system of claim 8, said read only backup instance being an incremental backup instances of said database.

10. The system of claim 8, said backup storage system being comprised in said system.

11. The system of claim 8, said backup storage system being accessed over said network connection.

12. The system of claim 8 further comprising:
    a presentation mechanism that presents said read/write version of said read only backup instance as a local storage device to said application, the read/write version presented by utilizing said read/write storage system to contain both said read only back up instance and said read/write file such that write operations from said application are stored separately in said read/write file by using the differencing mechanism and read operations for said application access said read only back up instance.

13. The system of claim 12, said presentation mechanism comprising Internet Small Computer System Interface protocol.

14. The system of claim 12, said presentation mechanism comprising a Common Internet File System protocol.

15. The system of claim 12, said differencing mechanism comprising a differencing Virtual Hard Disk.

16. The system of claim 15, said differencing Virtual Hard Disk being transmitted to a second device local to said application.

17. The system of claim 15, said differencing Virtual Hard Disk being configured to read from said read only backup instance.

18. A computer program product for use at a computer system, the computer program product for implementing a method for providing an application with access to a backup instance to perform a recovery operation, the computer program product comprising computer storage medium having stored thereon computer executable instruction that, when executed at a processor, cause the computer system to perform the method, including the following:
    receive a request for a backup version of a database from an application;
    create a recovered read only version of said database at a remote computer system remote to said application;
    configure said recovered read only version of said database for read/write access by configuring a differencing mechanism to create a read/write version of said recovered read only version, including establishing said recovered read only version as a parent object and establishing a read/write file as a child object of said recovered read only version to store captured changes to said recovered read only version; and
    use an Internet Small Computer System Interface initiator to communicate with an Internet Small Computer System Interface target at the remote computer system to present said read/write version to said application as a locally attached storage device.

19. The computer program product of claim 18, said application being operable on a first device, and said method being executed on said first device.

20. The computer program product of claim 19, said differencing mechanism including a Virtual Hard Disk.

* * * * *